United States Patent
Hara et al.

(10) Patent No.: US 6,470,255 B2
(45) Date of Patent: Oct. 22, 2002

(54) VEHICULAR BRAKING CONTROL APPARATUS AND CONTROL METHOD THEREOF

(75) Inventors: Kouichi Hara, Susono (JP); Hironori Miyakoshi, Seto (JP); Nobuyuki Furui, Nisshin (JP); Akira Hattori, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/916,674

(22) Filed: Jul. 30, 2001

(65) Prior Publication Data

US 2002/0022919 A1 Feb. 21, 2002

(30) Foreign Application Priority Data

Aug. 4, 2000 (JP) ........................................ 2000-237463

(51) Int. Cl.⁷ ................................................ B60T 13/00
(52) U.S. Cl. .............................. 701/70; 701/81; 303/95; 303/111; 303/184; 303/139
(58) Field of Search .............................. 701/70, 81, 78, 701/95; 303/155, 113.4, 111, 95, 166, 184, 150, 139, 125, 158

(56) References Cited

U.S. PATENT DOCUMENTS

| | | | |
|---|---|---|---|
| 4,805,104 A | * 2/1989 | Kishimoto et al. | 303/111 |
| 5,487,598 A | * 1/1996 | Rivard et al. | 303/166 |
| 5,539,641 A | * 7/1996 | Littlejohn | 303/20 |
| 5,664,850 A | * 9/1997 | Kuno et al. | 303/150 |
| 5,978,725 A | 11/1999 | Kagawa | 701/70 |
| 6,161,907 A | * 12/2000 | Luckevich et al. | 303/158 |
| 6,179,396 B1 | * 1/2001 | Fukami et al. | 303/155 |

FOREIGN PATENT DOCUMENTS

JP   11-157424 A   6/1999

* cited by examiner

*Primary Examiner*—Yonel Beaulieu
*Assistant Examiner*—Tuan C To
(74) *Attorney, Agent, or Firm*—Oliff & Berridge, PLC

(57) ABSTRACT

In a vehicular braking control apparatus and method, the hydraulic pressure on a wheel cylinder is gradually reduced with a relatively gentle gradient of reduction (k3) at the time when a braking operation member, operated by an operating person of the vehicle, is detected to have been operated to a predetermined position. At the time when a state of the braking operation is detected to have reached a predetermined threshold, the hydraulic pressure on the wheel cylinder is reduced with a relatively great gradient of reduction (k2). Therefore, it is possible to reduce vibrations of a brake pedal or the change in deceleration while adopting a relatively simple construction.

19 Claims, 11 Drawing Sheets

VEHICULAR BRAKING CONTROL APPARATUS AND CONTROL METHOD THEREOF

INCORPORATION BY REFERENCE

The disclosure of Japanese Patent Application No. 2000-237463 filed on Aug. 4, 2000, including the specification, drawings and abstract is incorporated herein by reference in its entirety.

BACKGROUND OF THE INVENTION

1. Field of Invention

The invention relates to a vehicular braking control apparatus and method that switches from an automatic braking mode based on an inter-vehicle distance control or the like, to a manual braking mode of applying braking force in accordance with the amount of operation performed by an operating person.

2. Description of Related Art

A braking control apparatus is known which automatically controls the braking force during an automatic braking mode so as to maintain at least a predetermined distance from a vehicle running ahead. If an operating person performs a braking operation during execution of the automatic braking mode, a process of discontinuing the automatic braking mode and giving higher priority to the braking operation of the operating person is executed. For example, Japanese Patent Application Laid-Open No. 11-157424 discloses a technique for reducing a change in braking force that can occur at the time of a switch from the automatic braking mode to the manual braking mode.

In the technique described in Japanese Patent Application Laid-Open No. 11-157424, a predetermined delay time is set when a braking operation is performed by an operating person. The delay time is set in accordance with the brake pedal depressing speed, the vehicle speed, etc. For example, if the brake pedal depressing speed is great, the delay time is set to a reduced time. A master cylinder pressure after elapse of the delay time is estimated. Then, a control of reducing the wheel cylinder pressure is performed in accordance with a pressure reducing characteristic such that after the delay time actually elapses, the wheel cylinder pressure becomes equal to the estimated master cylinder pressure. In this manner, the change in braking force that can occur at the time of switching of the braking mode is reduced.

However, if the above-described control technique is adopted, it becomes necessary to perform various estimating processes, such as the setting of a delay time, the estimation of a master cylinder pressure, etc. Thus, the load of the estimating processes becomes great. Furthermore, if an error occurs in an estimated value obtained as described above, vibrations caused by a hydraulic pressure change at the time of switching of the brake mode propagate to the brake pedal in some cases. In such cases, an operating person will have an uncomfortable feeling. Furthermore, if such a control technique is adopted, it becomes necessary to provide a sensor for detecting the wheel cylinder pressure that is used for the estimation processes.

SUMMARY OF THE INVENTION

The invention has been accomplished to address the aforementioned problems. It is one object of the invention to provide a vehicle braking control apparatus and method capable of reliably reducing a sharp hydraulic pressure change at the time of switching of the braking mode while employing a relatively simple construction that does not need either a complicated logic for estimation or an extra detection sensor.

A vehicular baking control apparatus and method in accordance with the invention applies braking force to a vehicle and includes a braking system that applies a braking force to a wheel in accordance with a liquid pressure of an operating liquid, a liquid pressure actuator which has a liquid pressure source that raises the liquid pressure of the operating liquid, and which causes a predetermined liquid pressure to act on the braking system separately from a braking operation of a braking operation member that generates a signal to generate the liquid pressure based on a braking operation of an operating person, and a controller that controls operation of the liquid pressure actuator. The controller (a) controls the liquid pressure actuator so that the liquid pressure supplied to the braking system is reduced with a first gradient of reduction, when the operating person operates the braking operation member to a predetermined position, and (b) controls the liquid pressure actuator so that the liquid pressure supplied to the braking system is reduced with a second gradient of reduction that is different from the first gradient of reduction, when a state of the braking operation of the operating person is greater than a predetermined threshold.

At a stage where the braking operation member is operated to the predetermined position, it is determined that a relatively gentle brake operation that can achieve a slight deceleration has been performed. Then, the controller reduces the liquid pressure supplied to the braking system with the first gradient of reduction, for example, a relatively gentle gradient of reduction. If the state of braking operation of the operating person is greater than the predetermined threshold, it is determined that the amount of operation of the braking operation member is great and that the operation person has performed a significant brake operation. Then, the controller reduces the liquid pressure supplied to the braking system with a gradient of reduction that is different from the first gradient of reduction, for example, a relatively great gradient of reduction.

Thus, the invention controls the liquid pressure actuator so as to achieve a predetermined gradient of reduction in a case where the supply of the liquid pressure by the liquid pressure actuator ends, and is followed by a shift to the liquid pressure based on the braking operation of the braking operation member. Therefore, the liquid pressure can be gradually changed, so that vibrations that are caused by a change in the liquid pressure and that can propagate to the braking operation member can be reduced. Furthermore, if an operating person has performed a firm and significant brake operation, the liquid pressure under control can be quickly changed to the liquid pressure based on the braking operation performed by the operating person.

BRIEF DESCRIPTION OF THE DRAWINGS

The above and other objects, features, advantages, technical and industrial significance of this invention will be better understood by reading the following detailed description of the preferred embodiments of the invention, when considered in connection with the accompanying drawings, in which.

DETAILED DESCRIPTION OF PREFERRED EMBODIMENTS

In the following description and the accompanying drawings, the present invention will be described in more detail in terms of preferred embodiments.

Figure 1:
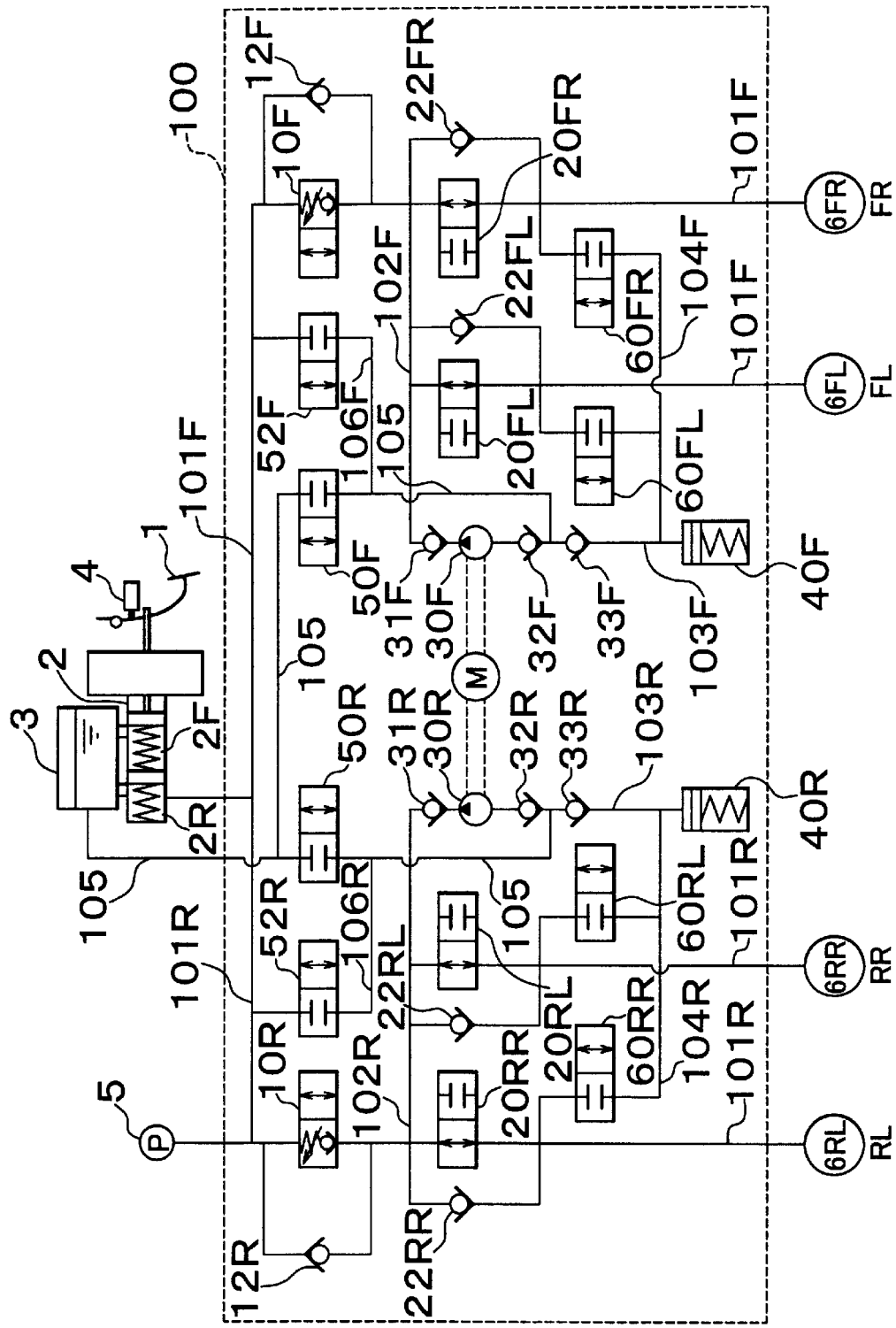
FIG. 1 is a block diagram schematically illustrating an overall construction of a braking apparatus.

A first embodiment of the invention will be described. FIG. 1 schematically illustrates an overall construction of a braking apparatus. Two independent pressure chambers 2F, 2R of a master cylinder 2 generate hydraulic pressures in accordance with the depressing operation on a brake pedal 1. A reservoir 3 is connected to the pressure chambers 2F, 2R of the master cylinder 2. The state of communication between the reservoir 3 and the pressure chambers 2F, 2R is changed in accordance with the position of a piston in the master cylinder 2.

The pressure chamber 2F of the master cylinder 2 is connected to wheel cylinders 6FR, 6FL that form braking mechanisms of right and left front wheels (FR, FL) via a hydraulic actuator 100 described below. Likewise, the pressure chamber 2R is connected via the liquid pressure actuator 100 to wheel cylinders 6RR, 6RL of braking mechanisms of right and left rear wheels (RR, RL).

Construction of the liquid pressure actuator 100 will be described.

A passage 101F connecting between the pressure chamber 2F and the wheel cylinders 6FR, 6FL, forming a hydraulic system of the front wheels FR, FL is provided with a control valve 10F. The control valve 10F has a linear valve port and a conduction port. The control valve 10F is designed to switch between the linear valve port and the conduction port in accordance with a command from a control unit 200 shown in FIG. 2. The linear valve port has a linear valve mechanism that is capable of linearly controlling the hydraulic pressure by blocking the flow of hydraulic oil from the pressure chamber 2F toward the wheel cylinders 6FR, 6FL and adjusting the flow of hydraulic oil from the wheel cylinders 6FR, 6FL to the pressure chamber 2F. The conduction port connects forward and rearward portions of the control valve 10F to the passage 101F. Furthermore, a check valve 12F that allows flow of hydraulic oil toward the wheel cylinders 6FR, 6FL and that blocks flow of hydraulic oil toward the pressure chamber 2F is provided in parallel with the control valve 10F.

The passage 101F between the control valve 10F and the wheel cylinders 6FR, 6FL has hold valves 20FR, 20FL that, when closed, contain hydraulic oil at the side of the wheel cylinders 6FR, 6FL. Furthermore, check valves 22FR, 22FL that prevent flow of hydraulic oil toward the wheel cylinders 6FR, 6FL are provided in parallel to the hold valves 20FR, 20FL.

A liquid pressure pump 30F driven by a motor M serves as a liquid pressure source at the time of an automatic control of the braking force. An ejection opening of the liquid pressure pump 30F is connected to the passage 101F between the control valve 10F and the wheel cylinders 6FR, 6FL via a lead-in passage 102F. In this case, the ejection opening of the liquid pressure pump 30F is connected to the passage 101F between the control valve 10F and the hold valves 20FR, 20FL. Thus, hydraulic oil delivered by the liquid pressure pump 30F can be supplied to the wheel cylinders 6FR, 6FL via the lead-in passage 102F and the passage 101F.

A suction opening side of the liquid pressure pump 30F is connected to a pressure accumulating chamber 40F via a passage 103F. The passage 103F is provided with check valves 32F, 33F that block flow of hydraulic oil in a direction opposite to the sucking direction. The lead-in passage 102F connected to the ejection opening of the liquid pressure pump 30F is provided with a check valve 31F that blocks flow of hydraulic oil in a direction opposite to the ejecting direction.

The passage 103F between the check valves 32F, 33F is connected to the reservoir 3 via a suction passage 105. Provided partway along the suction passage 105 is a suction valve 50F that is capable of change the state of conduction of the suction passage 105. The suction valve 50F is formed by an open-close valve that is opened and closed based on an ON-OFF signal.

The passage 101F and the suction passage 105 are interconnected by a passage 106F. The passage 106F is provided with a suction valve 52F that controls the state of suction of hydraulic oil from the passage 101F forming a normal brake line. The suction valve 52F is formed by an open-close valve that is opened and closed based on an ON-OFF signal.

The passages 101F between the hold valves 20FR, 20FL and the wheel cylinders 6FR, 6FL are connected to the pressure accumulating chamber 40F via pressure reduction passages 104F, respectively. The pressure reduction passages 104F are provided with pressure reducing valves 60FR, 60FL that are able to reduce the pressures in the wheel cylinders 6FR, 6FL by switching the state of the pressure reduction passages 104F between a conducting state and a blocked state. The pressure reducing valves 60FR, 60FL are each formed by an open-close valve that is opened and closed based on an ON-OFF signal.

A hydraulic system on the side of the rear wheels RR, RL extending between the pressure chamber 2R and the wheel cylinders 6RR, 6RL has substantially the same construction as the system on the side of the front wheels FR, FL.

Various component elements of the rear wheel RR, RL-side hydraulic system are represented in FIG. 1 by reference characters obtained by replacing "F" with "R" in the reference characters for various component elements of the front wheel FR, FL-side hydraulic system, and will not be described again.

The brake pedal 1 has a brake switch 4 that detects the depression of the brake pedal 1 to a predetermined position. A master pressure sensor 5 that detects the hydraulic pressure produced by the master cylinder 2 is provided for the passage 101R.

Figure 2:
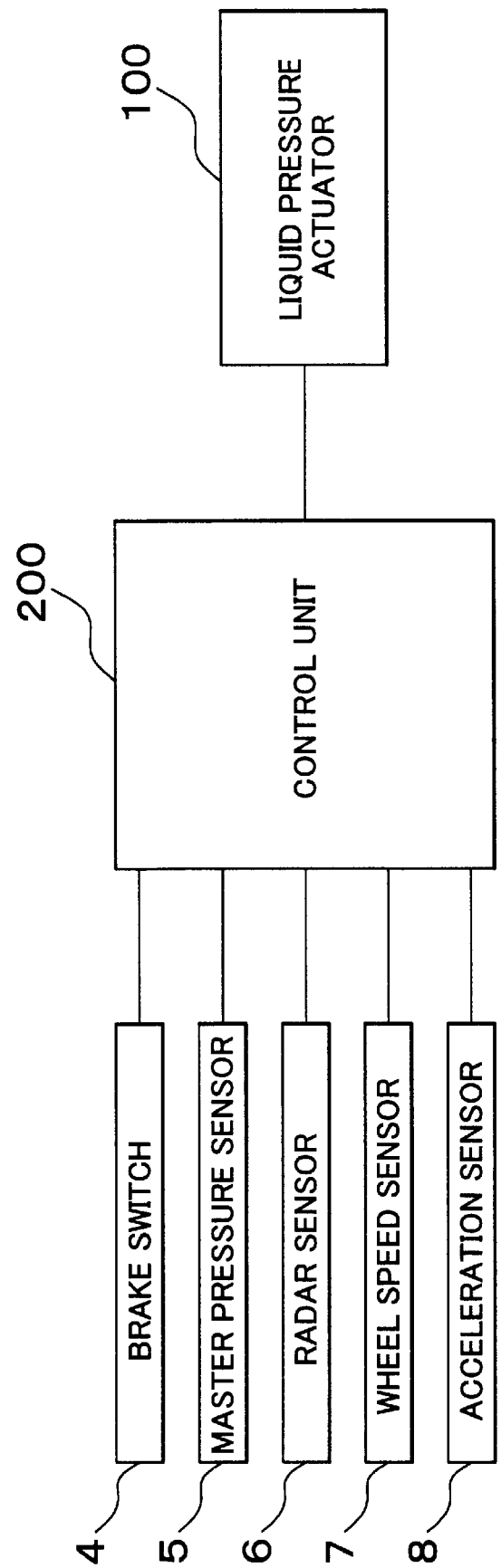
FIG. 2 is a block diagram schematically illustrating a control system of a liquid pressure actuator.

Thus, with regard to the liquid pressure actuator 100 made up of the pumps, the various valve devices, and the like, operation control is performed by the control unit 200. As shown in FIG. 2, the control unit 200 receives results of detection by the brake switch 4 and the master pressure sensor 5 and, furthermore, results of detection by a radar sensor 6 that detects an inter-vehicle distance with respect to a vehicle located ahead, wheel speed sensors 7 that detect rotation speeds of the wheels, an acceleration sensor 8 that detects the deceleration acting in the fore-aft directions of the vehicle, etc. When the vehicle is in a braked state, a deceleration is detected. Such a deceleration is expressed as a negative acceleration. That is, deceleration is the absolute value of acceleration. Although not shown in the drawings, the control unit 200 also receives detection results from a yaw rate sensor that detects the yaw rate, an accelerator pedal sensor that detects the amount of depression of the accelerator pedal, a shift position sensor that detects a speed set in the transmission, etc. Based on these detection results, the control unit 200 executes various controls, including an ABS (anti-lock brake system) control of preventing a locked state of a wheel, a traction control of reducing the acceleration slip tendency, a VS (vehicle stability) control of reducing the spin/drift tendency, a BA (brake assist) control of producing an increased braking force at the time of emergency braking, an inter-vehicle distance control of securing a predetermined inter-vehicle distance from a vehicle ahead, etc. In accordance with such various control operations, the control unit 200 controls the operation of the liquid pressure actuator 100.

Figure 7:
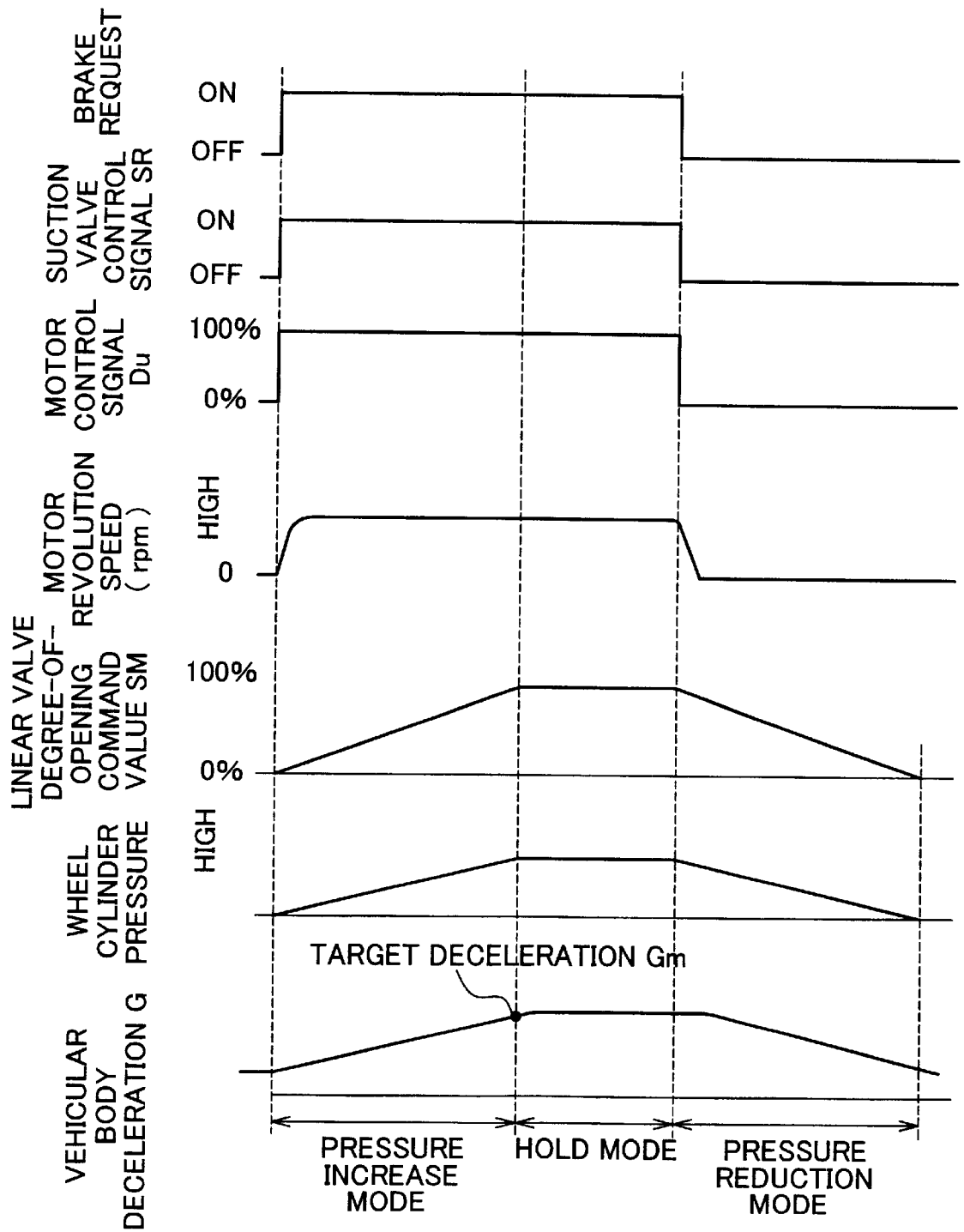
FIG. 7 is a diagram indicating time-dependent transitions of various signals, the wheel cylinder pressure, etc., in a pressure increase mode, a hold mode and a pressure reduction mode.

Of the braking controls executed by the control unit 200, the inter-vehicle distance control will be described with reference to the flowchart of FIG. 3 and also with reference to FIGS. 1 and 7. The inter-vehicle distance control is started if a predetermined executing condition is met, for example, if a fixed-speed running control is executed on a highway or the like. In the flowchart, "*" represents F or R and "**" represents FR, FL, RR or RL.

First, in step (hereinafter, simply referred to as "S") 102, the control unit 200 switches the control valves 10F, 10R to the linear valve port side, sets the hold valves 20FR, 20FL, 20RR, 20RL to an open valve state, sets the pressure reducing valves 60FR, 60FL, 60RR, 60RL to a closed valve state, and sets the suction valves 52F, 52R to a closed valve state, in order to execute the inter-vehicle distance control. The position of each of these valves is maintained until the inter-vehicle distance control ends.

Subsequently in S104, the control unit 200 reads in a deceleration G determined from a result of detection by the acceleration sensor 8, and an inter-vehicle distance X determined from a result of detection by the radar sensor 6.

Figure 4:
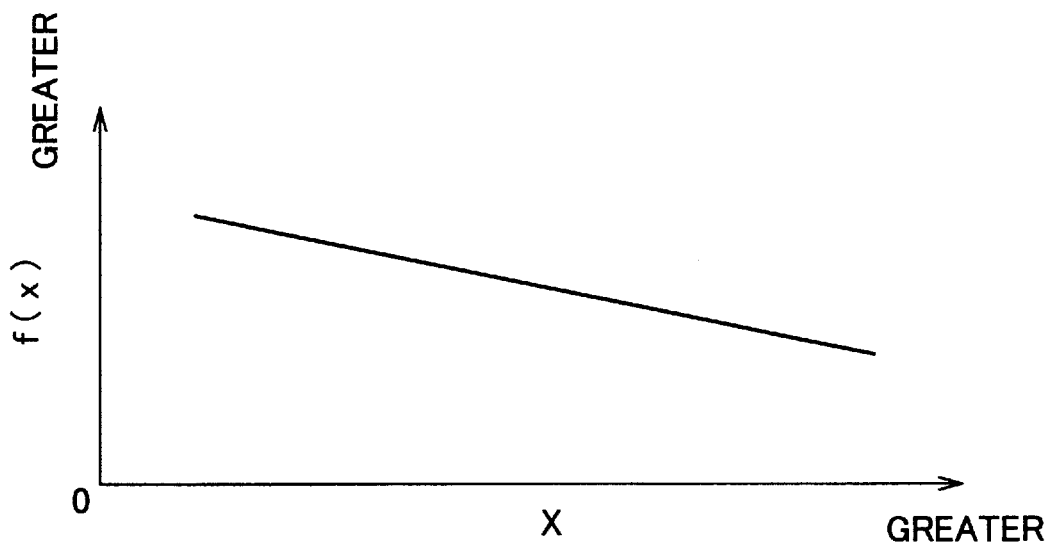
FIG. 4 is a graph indicating the relationship between the inter-vehicle distance X and a function f(X)
Figure 5:
FIG. 5 is a graph indicating the relationship between the magnitude of time-dependent change in the inter-vehicle distance X and a function g(dX/dt)

Subsequently in S106, the control unit 200 calculates an evaluation function A together with the inter-vehicle distance X read in S104. The evaluation function A is prescribed as $A=f(X)+g(dX/dt)$, where X and $f(X)$ have a relationship as indicated in FIG. 4, and $dX/dt$ and $g(dX/dt)$ have a relationship as indicated in FIG. 5.

Subsequently in S108, the control unit 200 determines whether the value of the evaluation function A calculated in S106 is at least equal to a threshold As. If the result of determination is "No", the control unit 200 proceeds to S122, in which the control unit 200 turns a brake request for automatically applying the brake to an OFF state. Subsequently in S124, the control unit 200 determines whether the value of a flag F1 is "1". This flag F1 is set as F1=1 if the automatic brake request is ON, that is, if a pressure increase mode or a hold mode described below is being executed. Since the automatic brake request is not currently ON, the flag F1 has been set to "0", and therefore determination of "No" is made in S124. Subsequently, this routine is ended.

Conversely, if the result of determination in S108 is "Yes", that is, if the value of the evaluation function A calculated in S106 is at least equal to the threshold As, the control unit 200 proceeds to S110, in which the control unit 200 sets the brake request for engaging automatic braking to the ON state, and indicates that the automatic brake actuating condition has been met.

Figure 6:
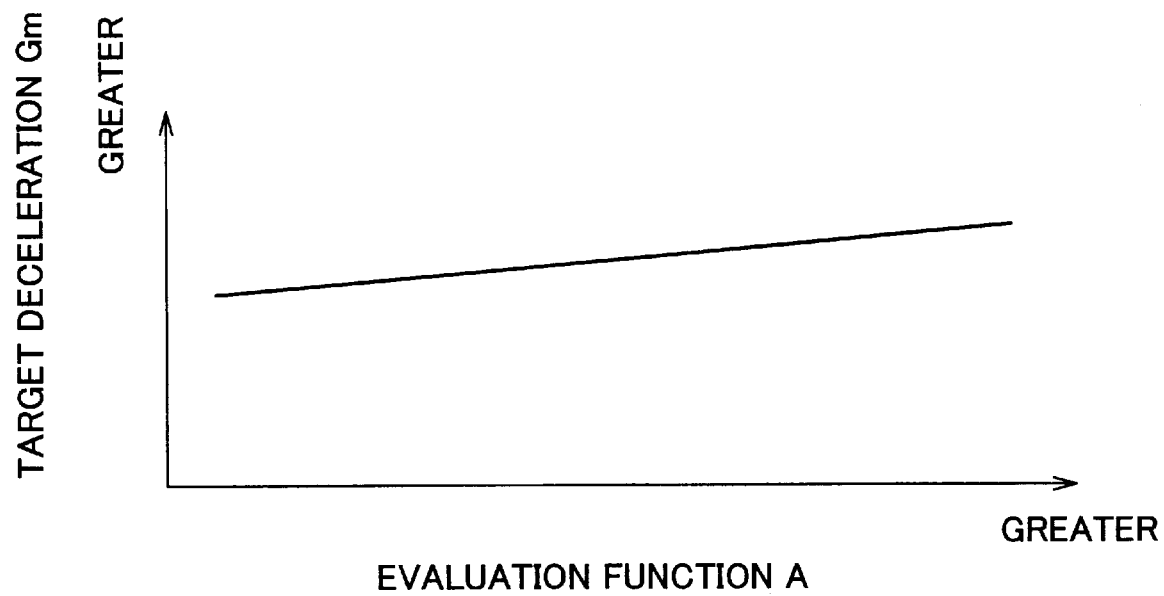
FIG. 6 is a map prescribing a relationship between an evaluation function A and the target deceleration Gm.

Subsequently in S112, the control unit 200 sets a target deceleration Gm of the vehicle corresponding to the magnitude of the evaluation function A calculated in S106, based on a map indicated in FIG. 6.

Subsequently in S114, the control unit 200 compares the target deceleration Gm set in S112 and the deceleration G read in S104. If the detected deceleration G is less than the target deceleration Gm "Yes" in S114), the control unit 200 proceeds to S116.

In S116, the control unit 200 executes a pressure increase-mode control of increasing the hydraulic pressure supplied to the wheel cylinders 6FR, 6FL, 6RR, 6RL. The suction valves 50F, 5OR are on-off valves that open when a control signal SR (hereinafter, referred to as "suction valve control signal SR") is in an ON state, and that close when the suction valve control signal SR is in an OFF state. In the pressure increase mode, the suction valve control signal SR=ON is output as indicated in FIG. 7. The motor M for the hydraulic pumps 30F, 30R is also duty-driven, and a control signal Du indicating the duty ratio is set as Du=100%, and is output. A degree-of-opening command value SM for the linear valve of each of the control valves 10F, 10R is increased from the previous degree-of-opening command value SM' by a predetermined value α and is output as SM=SM' +α. Therefore, the hydraulic pressure in each of the wheel cylinders 6FR, 6FL, 6RR, 6RL gradually increases.

After that, the control unit 200 sets the value of the flag F1 to "1" in S118, and then ends this routine. Therefore, as long as the pressure increase mode continues, the above-described process of outputting the various signals SR, Du and the command value SM is continued in the cycles of the routine that follow.

However, if during the pressure increase mode, the deceleration G reaches the target deceleration Gm ("No" in S114), the control unit 200 proceeds to S120, in which the control unit 200 shifts to a hold mode (fixed pressure mode) of holding the hydraulic pressure supplied to the wheel cylinders 6FR, 6FL, 6RR, 6RL.

In the hold mode, the suction valve control signal SR for the suction valves 50F, 5OR is held as SR=ON, and the control signal Du for the motor M is held as Du=100%. As for the degree-of-opening command value SM for the linear valves (control valves 10F, 10R), the value in the previous cycle is maintained.

If during execution of the hydraulic control in the pressure increase mode (S116) or the hold mode (S120), determination of "No" is made in S108, that is, the value of the evaluation function A calculated in S106 has become less than the threshold As, the control unit 200 proceeds to S122, in which the control unit 200 sets the brake request to the OFF state. Subsequently in S124, the control unit 200 determines whether the value of the flag F1 is F1=1. Since the flag F1=1 has been set in this situation, the result of determination in S124 is "Yes", and the process proceeds to S126, In S126, the control unit 200 determines whether the value of a flag F2 is "0". The flag F2 is a flag that is set as F2=1 if the pressure reduction mode is being executed. Since at the aforementioned time, the flag F2=0 has been set, the control unit 200 proceeds to S128.

In S128, the control unit 200 starts a timer for measuring the time of execution of the pressure reduction mode. Subsequently in S130, the control unit 200 sets the value of the flag F2 as F2=1, thereby indicating that the process in the pressure reduction mode has started.

Subsequently in S132, the control unit 200 executes a pressure reduction-mode control of reducing the hydraulic pressure supplied to the wheel cylinders 6FR, 6FL, 6RR, 6RL. In the pressure reduction mode, too, the suction valve control signal SR is set as SR=ON, and the control signal Du (duty ratio) of the motor M is set as Du=100%. In this state, the degree-of-opening command value SM with respect to the linear valves (control valves 10F, 10R) is set as in SM=SMo−k1×T, where SMo is the degree-of-opening command value occurring at the time of the shift to the pressure reduction mode, T is the count value of the timer read in S132, and k1 is a predetermined gradient of reduction. The gradient of reduction is expressed as the absolute value of a gradient. That is, k1 is a positive value. The same description applies to the gradients of reduction mentioned below (k2, k3) as well.

Subsequently in S134, the control unit 200 determines whether the timer count value T has become equal to or greater than a prescribed threshold Ts. If the result of determination is "No", the control unit 200 ends this routine. In the next cycle of the routine, the result of determination in S126 is "No" since the flag F2=1 has been set. Therefore, the process proceeds to step S132, thus repeating substantially the same process.

As S132 is repeated, the linear valve degree-of-opening command value SM decreases with a constant gradient of reduction (k1). Therefore, the linear valves (control valves 10F, 10R) gradually open, so that hydraulic pressure confined between the hydraulic pumps 30F, 30R and the wheel cylinders 6FR, 6FL, 6RR, 6RL exits to the master cylinder 2 side. Thus, the hydraulic pressure in the wheel cylinders 6FR, 6FL, 6RR, 6RL gradually decreases.

If determination of "Yes" is made in S134, that is, if the timer count value T becomes equal to or greater than the prescribed threshold Ts, the process proceeds to S135. In S135, the control unit 200 sets the suction valve control signal SR as SR=OFF to close the suction valves 50F, 50R, sets the control signal Du (duty ratio) of the motor M as Du=0% to stop the motor M, and sets the linear valve degree-of-opening command value SM as SM=0% (fully open).

After that, the control unit 200 proceeds to S136, in which the control unit 200 resets the flags F1, F2 to "0", and resets the timer to be ready for the next time measurement. The threshold Ts is a value that is prescribed as a time that allows the hydraulic pressure in the wheel cylinders 6FR, 6FL, 6RR, 6RL to become zero if the degree-of-opening command value SM for the linear valves (control valves 10F, 10R) is reduced with the gradient of reduction (k1).

In the above-described manner, control of the pressure increase mode, the hold mode and the pressure reduction mode is performed.

This embodiment has been described in conjunction with the braking control in the case where braking force is applied to each of the four wheels. However, in the case of a two-wheel drive vehicle, the embodiment may be applied only to the drive wheels, that is, the front wheels or the rear wheels.

Next, a second embodiment will be described.

The second embodiment will be described in conjunction with a process executed in a case where if an operating person performs a brake operation during execution of a braking control of automatically applying braking force as described above in conjunction with the first embodiment, the braking control is ended in order to give higher priority to the brake operation performed by the operating person. Description will be made with reference to the flowchart of FIG. 8.

In S202, it is determined whether the hydraulic pressure P of the master cylinder 2 detected by the master pressure sensor 5 is greater than a threshold Pth. If the result of determination is "No", the process proceeds to S204, in which it is determined whether the brake switch 4 has been turned on. If the result of that determination is "No", which means that no brake operation performed by an operating person has been detected, the routine is ended without any further processing.

Figure 9:
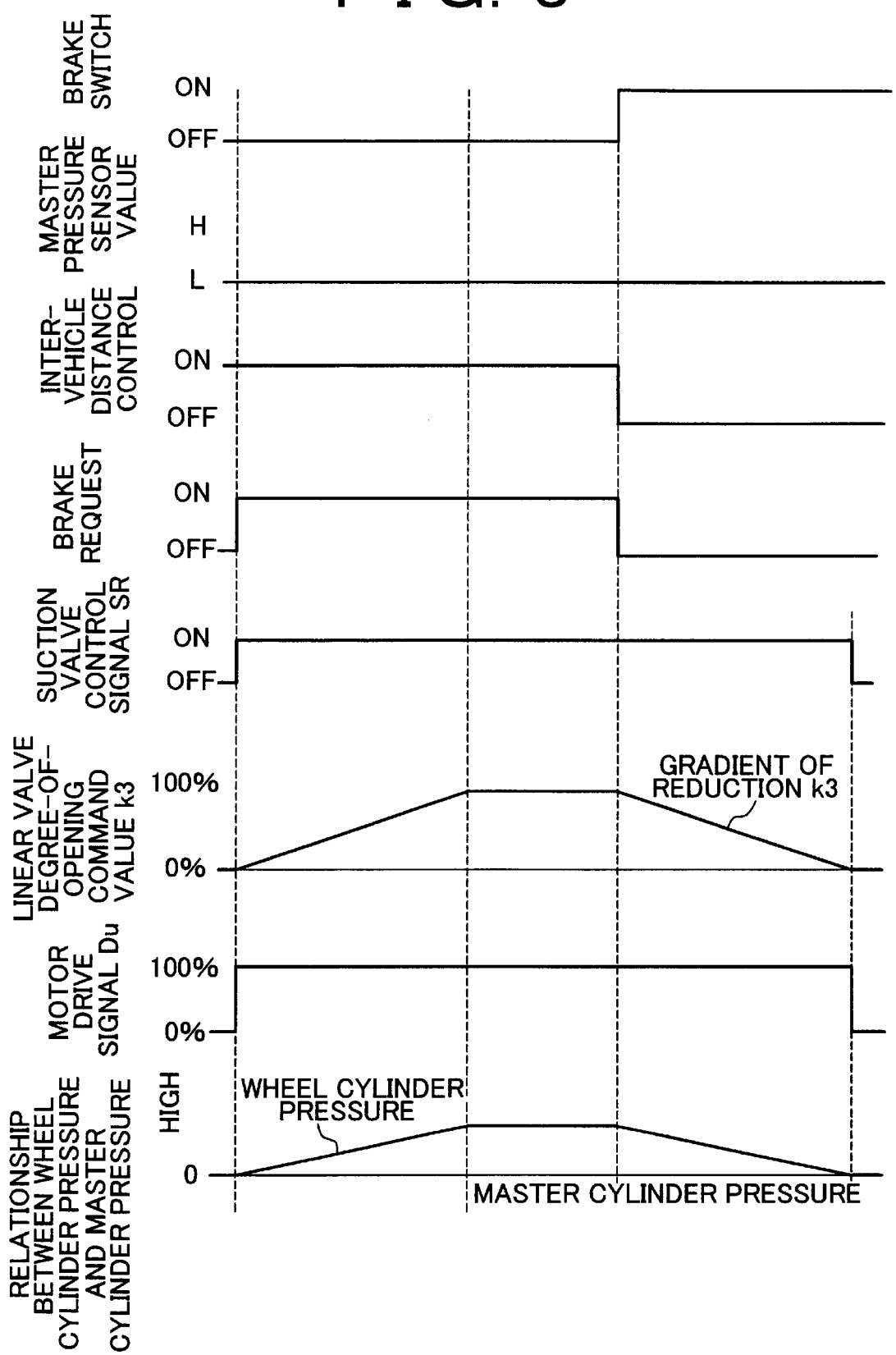
FIG. 9 is a diagram indicating time-dependent transitions of various signals, the wheel cylinder pressure, the master cylinder pressure, etc., when an ending control illustrated in FIG. 8 is executed in a case where the brake switch is in an on-state but the hydraulic pressure detected by a master pressure sensor is not sufficiently increased.

If an operating person has applied a slight depressing force to the brake pedal 1, a case may occur in which the brake switch 4 is turned on but the hydraulic pressure P detected by the master pressure sensor 5 does not sufficiently rise as indicated in FIG. 9. In this case, determination of "No" is made in S202, and determination of "Yes" is made in S204. After that, the process proceeds to S206.

Figure 3:
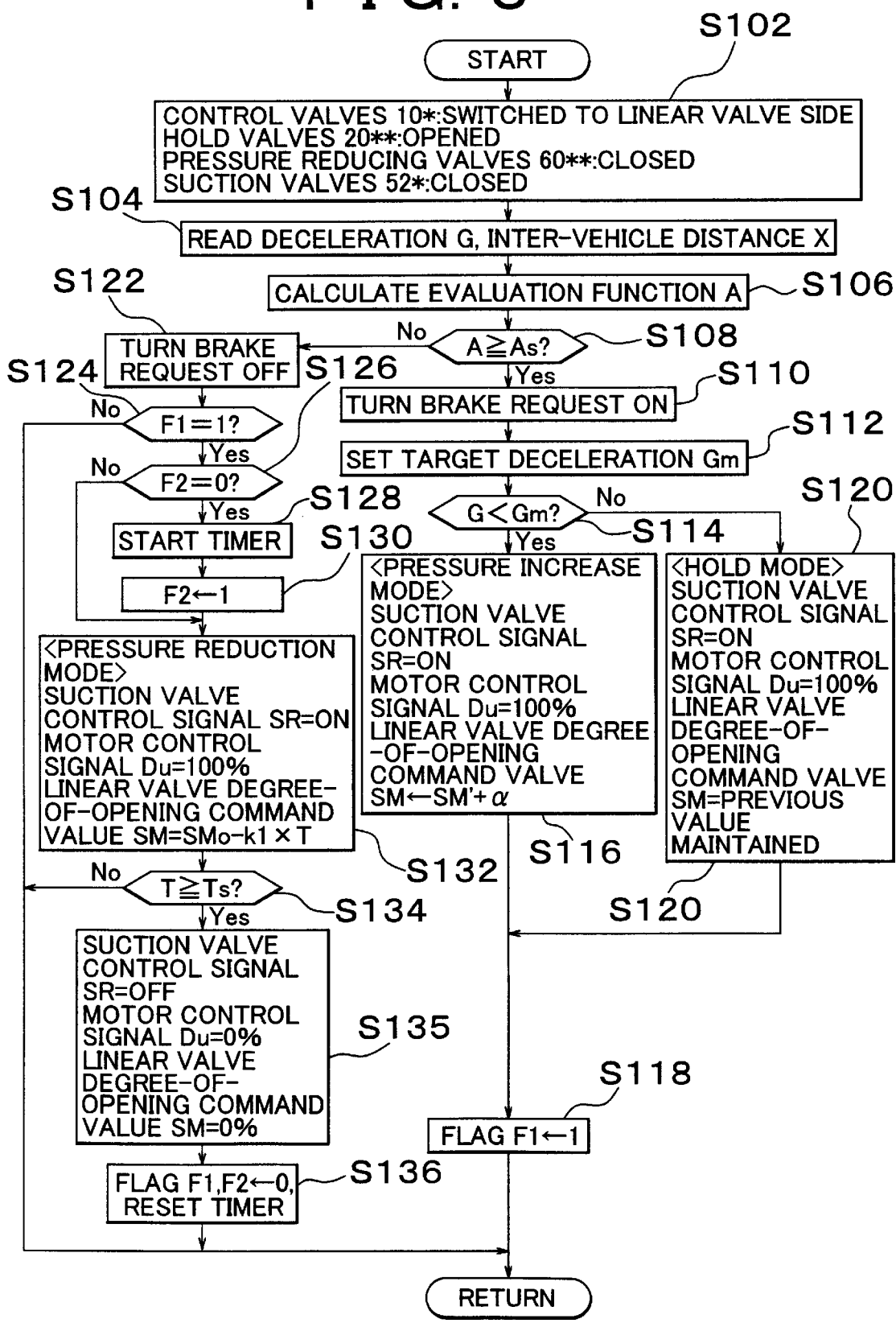
FIG. 3 is a flowchart illustrating an inter-vehicle distance control executed by a control apparatus.
Figure 8:
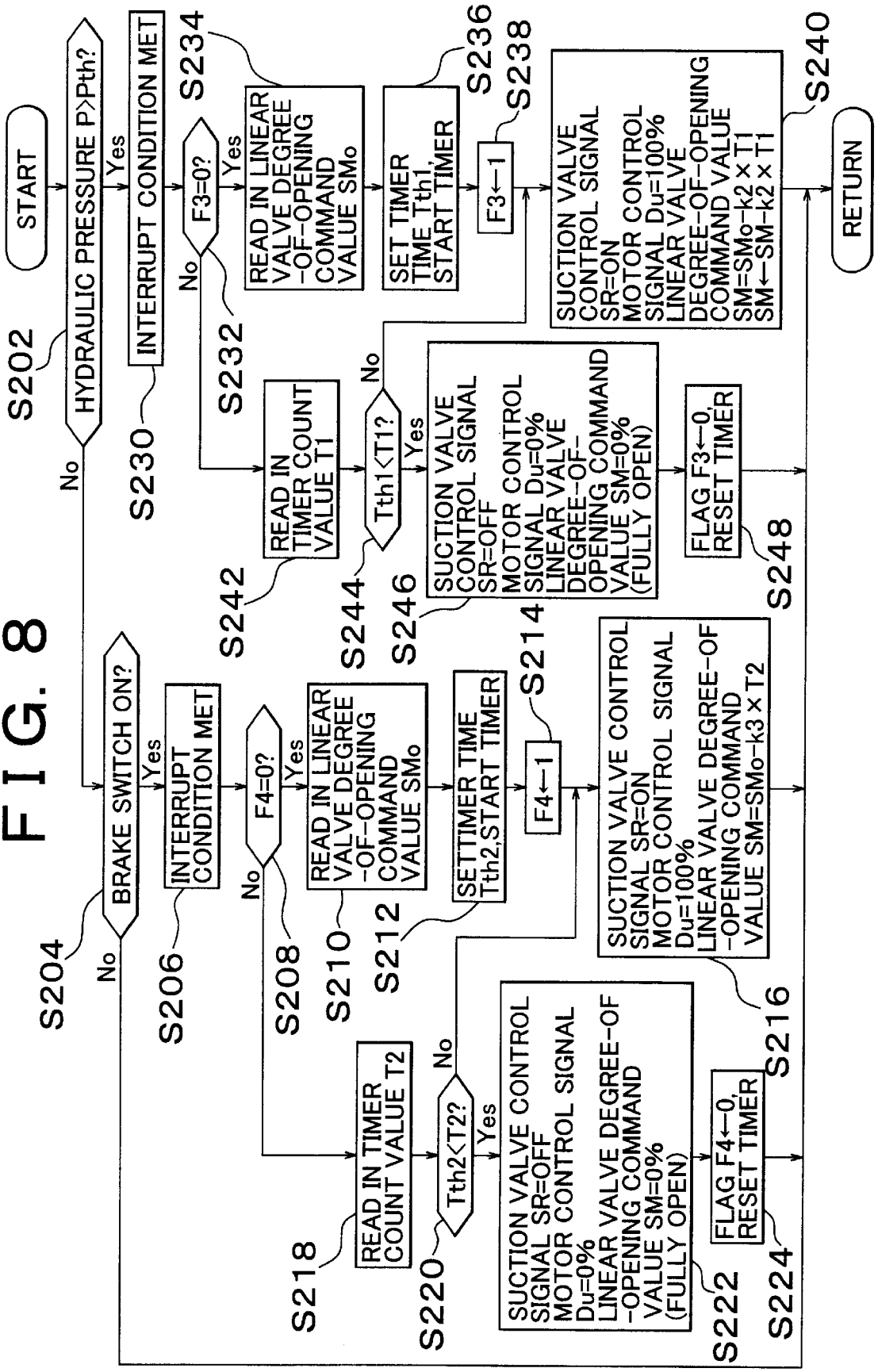
FIG. 8 is a flowchart illustrating a process executed when the braking control illustrated in FIG. 3 is to be ended upon a brake operation performed by an operating person.

In S206, it is considered that an interrupt condition for the braking control shown in FIG. 3 described above has been met, and the braking control of FIG. 3 is immediately stopped, and the control process illustrated in FIG. 8 is executed with higher priority.

Subsequently in S208, it is determined whether the value of a flag F4 equals "0". Due to the initial setting, the flag F4=0 has been set. Therefore, the result of the determination is "Yes", and the process proceeds to S210.

Figure 12:
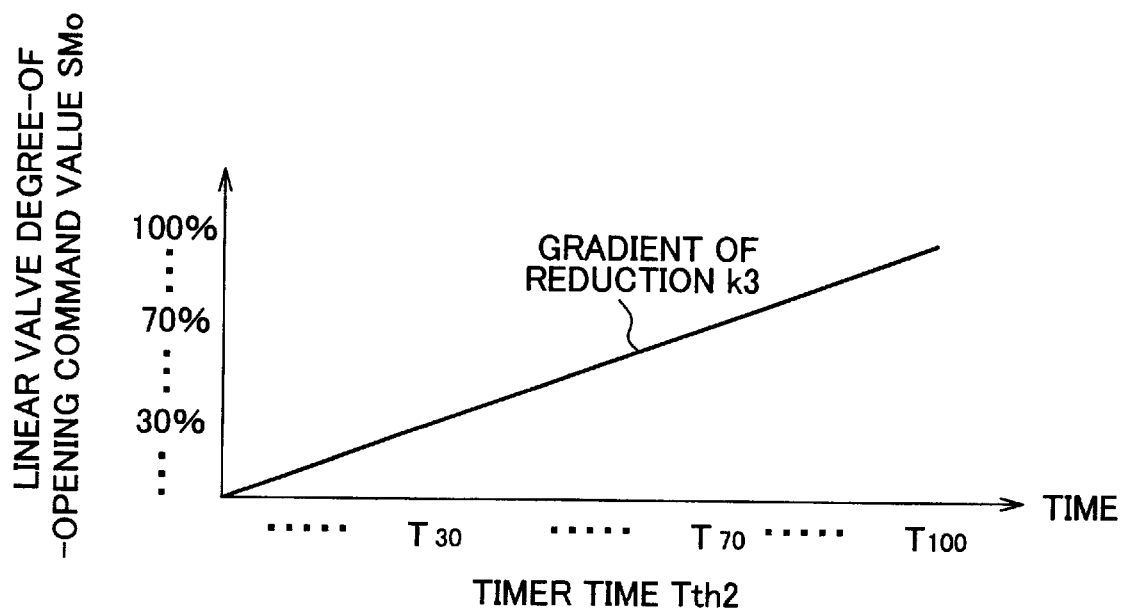
FIG. 12 is a map prescribing a relationship between the linear valve degree-of-opening command value SMo and the timer time Tth2 based on a gradient of reduction (k3)

In S210, the present-time degree-of-opening command value SMo for the linear valves forming the control valves 10F, 10R is read in. Subsequently in S212, a timer time Tth2 corresponding to the degree-of-opening command value SMo is set based on a map indicated in FIG. 12. The map of FIG. 12 is a map that indicates the time needed for the degree of opening of the linear valve to change to the fully open state if the degree-of-opening command value SMo is reduced with a gradient of reduction (k3). For example, if the degree-of-opening command value SMo is 100% (completely closed) at the present time, the timer time Tth2=$T_{100}$ is set. In S212, the timer is then started to start time measurement by the timer.

Subsequently in S214, the value of the flag F4 is set as F4=1, thereby indicating that the time measurement by the timer has started.

Then, the process proceeds to S216, in which a process similar to that in the pressure reduction mode described above is executed. That is, the suction valve control signal SR is set as SR=ON, the control signal Du of the motor M is held at Du=100%, and the degree-of-opening command value SM for the linear valves (control valves 10F, 10R) is set as SM=SMo—k3×T2 where SMo is the degree-of-opening command value occurring at the time of the reading in S210, and k3 is a gradient of reduction as described above, and T2 is a count value of the timer started in S212. The thus-set degree-of-opening command value SM is outputted.

When S208 is reached during the next cycle of the routine, the result of determination in S208 is "No" since the flag F4 has been set as F4=1. The process then proceeds to step S218.

In S218, the count value T2 of the timer is read. Subsequently in S220, it is determined whether the count value T2 of the timer has exceeded the timer time Tth2 set in S212. If the result of the determination is "No", the process proceeds to S216, thus repeating substantially the same process.

Therefore, as long as the pressure of the master cylinder 2 is at most at least the threshold Pth and the brake switch 4 is in the on-state, the linear valves (control valves 10F, 10R) are gradually opened due to the effect of the relatively gentle gradient of reduction k3).

When the count value T2 of the timer exceeds the timer time Tth2 "Yes" in S220), the process proceeds to S222. In S222, the suction valve control signal SR is set as SR=OFF to close the suction valves 50F, 50R, the control signal Du (duty ratio) of the motor M is set as Du=0% to stop the motor M, and the degree-of-opening command value SM is set as SM=0% (fully open). Then, the control valves 10F, 10R are switched to the conducting port side.

Subsequently in S224, the flag F4 is reset to F4=0, and the timer is reset to be ready for the next time measurement.

In a situation where the pressure of the master cylinder 2 is at most at least the threshold Pth and the brake switch 4 is in the on-state, the master cylinder 2 is connected to the reservoir 3 having a pressure close to the atmospheric pressure. If in such a situation the control valves 10F, 10R are immediately switched to the conducting port side, the hydraulic pressure on the wheel cylinders 6FR, 6FL, 6RR, 6RL immediately changes, so that the effect of such an immediate change may manifest itself as a change in the deceleration, and may discomfort an operating person. Therefore, by gradually opening the linear valves (control valves 10F, 10R) with the relatively gentle gradient of reduction (k3), the hydraulic pressure on the wheel cylinders 6FR, 6FL, 6RR, 6RL can be gradually reduced to become equal to the hydraulic pressure on the master cylinder 2 (see FIG. 9). Hence, the discomfort caused by a deceleration change at the time of discontinuation of the braking control can be reduced.

Referring back to the flowchart of FIG. 8, if the amount of depression of the brake pedal 1 accomplished by an operating person is great, there is a case where before the brake switch 4 is turned on, the hydraulic pressure P on the master cylinder 2 increases to or above the threshold Pth. In such a case, determination of "Yes" is made in S202, and the process proceeds to S230. In S230, it is considered that the interrupt condition for the braking control indicated in FIG. 3 has been met, and the braking control illustrated in FIG. 3 is immediately stopped and the control process illustrated in FIG. 8 is executed with higher priority.

Subsequently in S232, it is determined whether the value of a flag F3 equals "0". Due to the initial setting, the flag F3=0 has been set. Therefore, the result of the determination is "Yes", and the process proceeds to S234.

Figure 13:
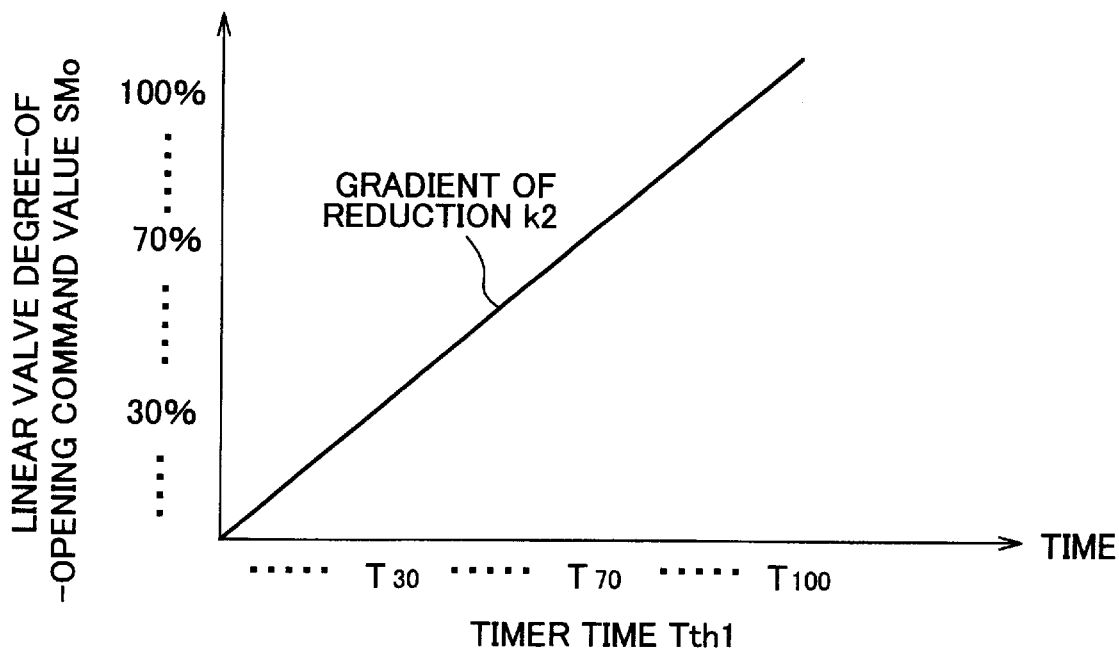
FIG. 13 is a map prescribing a relationship between the linear valve degree-of-opening command value SMo and the timer time Tth1 based on a gradient of reduction (k2).

In S234, a present-time degree-of-opening command value SMo for the linear valves forming the control valves 10F, 10R is read, and SMo is substituted for the degree-of-opening command value SM. Subsequently in S236, a timer time Tth1 corresponding to the degree-of-opening command value SM (=SMo) is set based on a map indicated in FIG. 13. The map of FIG. 13 is a map that indicates the time needed for the degree of opening of the linear valve to reach a fully open state if the degree-of-opening command value SM (=SMo) is reduced with a gradient of reduction (k2) (k2>k3). Furthermore in S236, the timer is started so as to start time measurement by the timer.

Subsequently in S238, the value of the flag F3 is set as F3=1, thereby indicating that the time measurement by the timer has started.

Subsequently, the process proceeds to S240, in which a process similar to that in the pressure reduction mode described above is executed. That is, the suction valve control signal SR for the suction valves 50F, 50R is held at SR=ON, and the control signal Du of the motor M is held at Du=100%, and the degree-of-opening command value SM for the linear valves (control valves 10F, 10R) is set as SM=SMo−k2−T1 where SMo is the degree-of-opening command value occurring at the time of the reading in S234, k2 is a gradient of reduction as described above, and T1 is a count value of the timer started in S236. The thus-set degree-of-opening command value SM is output.

During the next cycle of the routine, determination of "No" is made in S232 since the flag F3 has been set as F3=1. The process then proceeds to S242.

In S242, the count value T1 of the timer is read. Subsequently in S244, it is determined whether the count value T1 of the timer has exceeded the timer time Tth1 set in S236. If the result of determination is "No", the process proceeds to S240 described above, in which SMo−k2×T1 is newly calculated as a degree-of-opening command value SM, and substantially the same process is repeated.

Therefore, if the pressure on the master cylinder 2 becomes greater than threshold Pth, the linear valves (control valves 10F, 10R) are gradually opened due to the effect of the relatively great gradient of reduction (k2).

When the count value T1 of the timer exceeds the timer time Tth1 "Yes" in S244), the process proceeds to S246. In S246, the suction valve control signal SR is set as SR=OFF to close the suction valves 50F, 50R, the control signal Du (duty ratio) of the motor M is set as Du=0% to stop the motor M, and the degree-of-opening command value SM is set as SM=0% (fully open). Then, the control valves 10F, 10R are switched to the conducting port side.

Subsequently in S248, the flag F3 is reset to F3=0, and the timer is reset to be ready for the next time measurement.

In a situation where the pressure on the master cylinder 2 becomes greater than the threshold Pth before the brake switch 4 is turned on, the communication between the master cylinder 2 and the reservoir 3 is in a blocked state. If under such a condition, the control valves 10F, 10R are immediately switched to the conducting port side, the hydraulic pressure on the wheel cylinders 6FR, 6FL, 6RR, 6RL acts on the master cylinder 2, so that hydraulic pressure in the master cylinder 2 instantly rises. Vibrations caused at this moment propagate to the brake pedal 1, thus discomforting the operating person, who is operating the brake.

Figure 10:
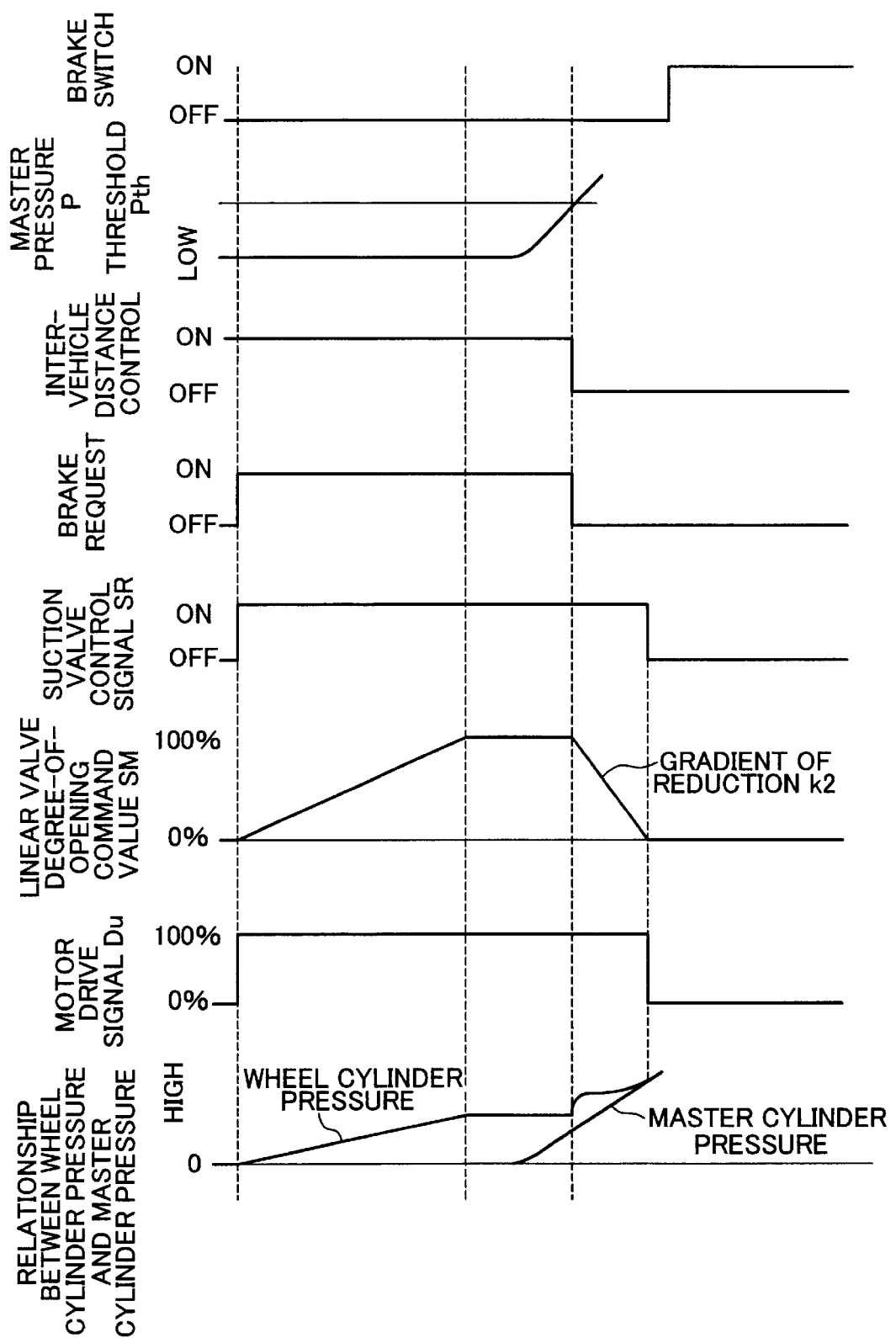
FIG. 10 is a diagram indicating time-dependent transitions of various signals, the wheel cylinder pressure, the master cylinder pressure, etc., when the ending control of FIG. 8 is executed in a case where the hydraulic pressure detected by the master pressure sensor is increased.

Therefore, by opening the linear valves (control valves 10F, 10R) based on the relatively great gradient of reduction (k2), it becomes possible to perform an operation in which at the time of the pressure on the master cylinder 2 exceeding the threshold Pth, a shift is made as quickly as possible to give higher priority to a braking operation performed by the operating person, and in which the hydraulic pressure on the wheel cylinders 6FR, 6FL, 6RR, 6RL and the hydraulic pressure on the master cylinder 2 can be brought close to each other (see FIG. 10) so that vibrations caused by hydraulic pressure changes will not be felt by an operating person via the brake pedal.

Figure 11:
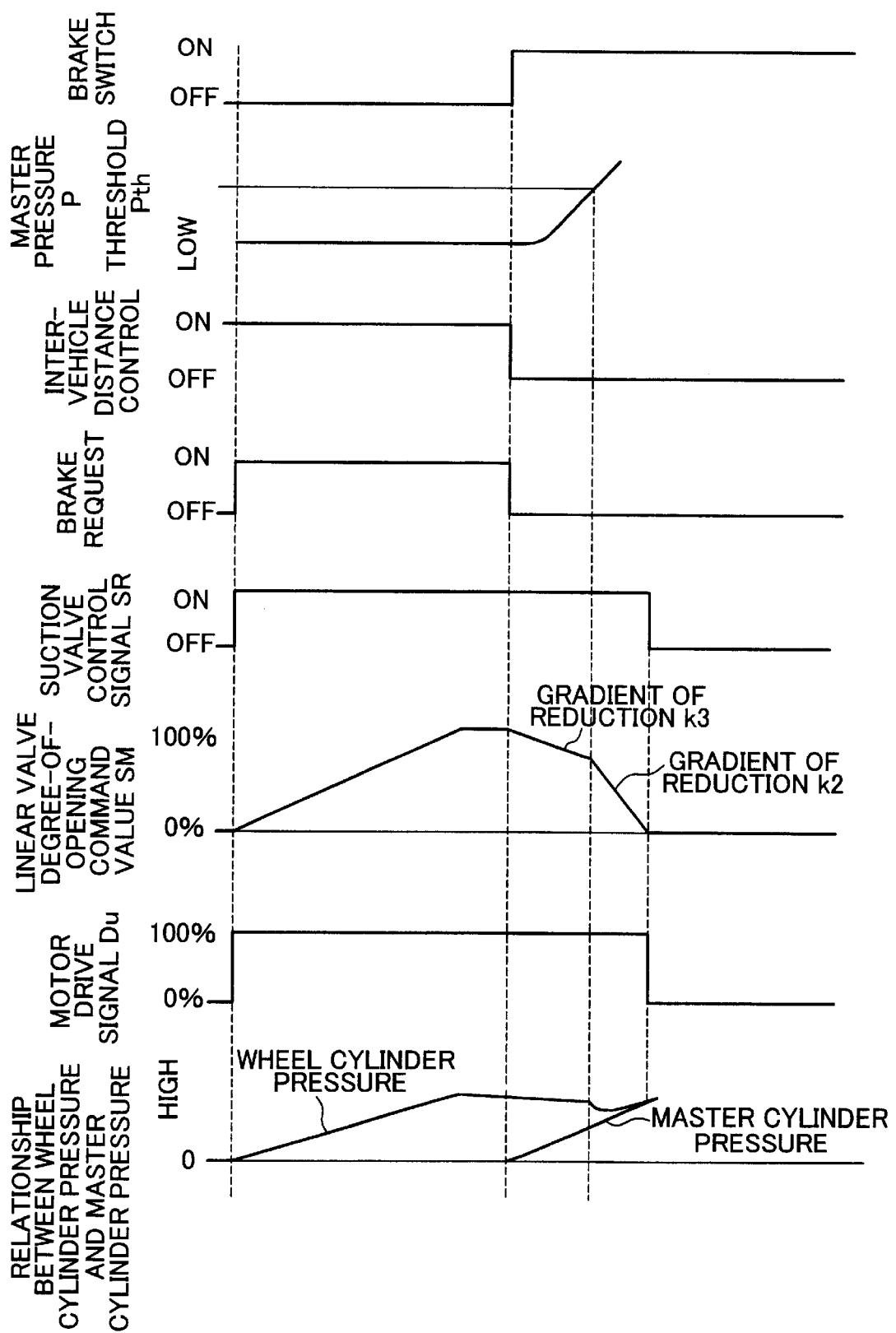
FIG. 11 is a diagram indicating time-dependent transitions of various signals, the wheel cylinder pressure, the master cylinder pressure, etc., when the ending control of FIG. 8 is executed in a case where after the brake switch is turned on, the hydraulic pressure detected by the master pressure sensor is increased.

There is a case where after the brake switch 4 is turned on, the hydraulic pressure P on the master cylinder 2 increases to or above the threshold Pth as indicated in FIG. 11. In this case, too, the flowchart illustrated in FIG. 8 is directly applied. That is, at the time of detection of the on-state of the brake switch 4 ("No"in S202, and "Yes" in S204), the processing of S216 employing the relatively gentle gradient of reduction (k3) is repeatedly executed. After that, when the hydraulic pressure P on the master cylinder 2 increases to or above the threshold Pth ("Yes" in S202), a shift to the processing of S240 employing the relatively great gradient of reduction (k2) is made.

In the foregoing embodiments, the linear valves forming the control valves 10F, 10R are formed by, for example, a type of valve device in which the degree of valve opening of a needle valve is controlled. However, instead of such linear valves, open-close valves that are opened and closed due to ON-OFF signals may be used to form the control valves 10F, 10R. In such a case the differential pressure therebetween can be controlled through the duty-driving of the ON-OFF state.

Furthermore, although in the foregoing embodiments, the suction valves 50F, 50R are open-close valves that are opened and closed by ON-OFF signals, the suction valves 50F, 50R may also be formed by a type of valve device in which the degree of valve opening is controlled.

Furthermore, the foregoing embodiments employ the brake switch 4, the master pressure sensor 5 and the like as mechanisms for detecting the braking operation performed by an operating person. The mechanisms for detecting the braking operation performed by an operating person are not limited to the brake switch 4, the master pressure sensor 5, or the like, but may also be a stroke sensor for detecting the stroke of the brake pedal, a sensor or switch for detecting the brake pedal depressing force, etc.

As described above, the vehicular braking control apparatus in accordance with the invention adopts a construction that includes a controller that controls a liquid pressure actuator with a first gradient of pressure reduction if a braking operation is detected by an operation position detector, and controls the liquid pressure actuator with a second gradient of reduction that is greater that the first gradient of reduction if the state of operation detected by an operation state detector is greater than a predetermined threshold. The first gradient of reduction and the second gradient of reduction are not limited to the aforementioned values or the like, but may assume various suitable values so as to reduce changes in the deceleration of the vehicle. This construction makes it possible to suitably control the changes in liquid pressure occurring at the time of the switching of the brake mode, in accordance with braking operation performed by an operating person. Therefore, it becomes possible to reliably reduce the vibrations of the brake pedal or the changes in deceleration caused by changes in the liquid pressure while adopting a relatively simple construction that does not need a complicated estimation logic or an extra detection sensor.

In the illustrated embodiment, the controller (the control unit 200) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicular braking control apparatus for applying braking force to a vehicle, comprising:
   a braking system that applies a braking force to a wheel in accordance with a liquid pressure of an operating liquid;
   a liquid pressure actuator which has a liquid pressure source that raises the liquid pressure of the operating liquid, and which causes a predetermined liquid pressure to act on the braking system separately from a braking operation of a braking operation member that generates a signal to generate the liquid pressure based on a braking operation of an operating person; and
   a controller that controls operation of the liquid pressure actuator, and that (a) controls the liquid pressure actuator so that the liquid pressure supplied to the braking system is reduced with a first gradient of reduction, when the operating person operates the braking operation member to a predetermined position, and (b) controls the liquid pressure actuator so that the liquid pressure supplied to the braking system is reduced with a second gradient of reduction that is different from the first gradient of reduction, when a state of the braking operation is at least equal to a predetermined threshold, with no relation to whether or not the braking operation member is operated to the position of the predetermined position.

2. A vehicular braking control apparatus according to claim 1, wherein the second gradient of reduction is greater than the first gradient of reduction.

3. A vehicular braking control apparatus according to claim 2, further comprising:
- an operation position detector that detects a position of the braking operation member; and
- an operation state detector that detects a state of operation of the braking operation member,
- wherein the predetermined position of the braking operation member is detected by the operation position detector, and the state of the braking operation is detected by the operation state detector.

4. A vehicular braking control apparatus according to claim 3, wherein the operation position detector comprises an accelerator pedal and a detector that detects a position of the accelerator pedal.

5. A vehicular braking control apparatus according to claim 4, wherein the operation state detector comprises a pressure gage and a master cylinder that generates a liquid pressure in accordance with a load applied to the accelerator pedal.

6. A vehicular braking control apparatus according to claim 3, wherein:
- the liquid pressure actuator farther comprises a linear valve that controls the liquid pressure linearly with respect to the signal, and
- the liquid pressure supplied to the braking system is reduced by increasing a degree of opening of the linear valve.

7. A vehicular braking control apparatus according to claim 6, wherein operation of the liquid pressure source of the liquid pressure actuator is stopped when the degree of opening of the linear valve reaches a maximum.

8. A vehicular braking control apparatus according to claim 2, wherein:
- the liquid pressure actuator further comprises a linear valve that controls the liquid pressure linearly with respect to the signal, and
- the liquid pressure supplied to the braking system is reduced by increasing a degree of opening of the linear valve.

9. A vehicular braking control apparatus according to claim 8, wherein operation of the liquid pressure source of the liquid pressure actuator is stopped when the degree of opening of the linear valve reaches a maximum.

10. A vehicular braking control apparatus according to claim 2, wherein when the liquid pressure actuator causes the predetermined liquid pressure to act on the braking system separately from the braking operation of the braking operation member, there are at least three modes:
- a pressure reduction mode in which the liquid pressure that acts on the braking system is reduced;
- a pressure increase mode in which the liquid pressure that acts on the braking system is increased; and
- a hold mode in which the liquid pressure that acts on the braking system is maintained.

11. A vehicular braking control apparatus according to claim 10, wherein:
- the liquid pressure actuator further comprises a linear valve that controls the liquid pressure linearly with respect to the signal, and
- the pressure reduction mode is accomplished by increasing a degree of opening of the linear valve, the pressure increase mode is accomplished by reducing the degree of opening of the linear valve, and the hold mode is accomplished by holding the degree of opening of the linear valve.

12. A vehicular braking control apparatus according to claim 1, further comprising:
- an operation position detector that detects a position of the braking operation member; and
- an operation state detector that detects a state of operation of the braking operation member,
- wherein the predetermined position of the braking operation member is detected by the operation position detector, and the state of the braking operation is detected by the operation state detector.

13. A vehicular braking control apparatus according to claim 1, wherein:
- the liquid pressure actuator further comprises a linear valve that controls the liquid pressure linearly with respect to the signal, and
- the liquid pressure supplied to the braking system is reduced by increasing a degree of opening of the linear valve.

14. A vehicular braking control apparatus according to claim 1, wherein when the liquid pressure actuator causes the predetermined liquid pressure to act on the braking system separately from the braking operation of the braking operation member, there are at least three modes:
- a pressure reduction mode in which the liquid pressure that acts on the braking system is reduced;
- a pressure increase mode in which the liquid pressure that acts on the braking system is increased; and
- a hold mode in which the liquid pressure that acts on the braking system is maintained.

15. A control method for controlling braking force on a vehicle, comprising:
- detecting whether a braking operation member that generates a signal to generate a liquid pressure in an operating liquid based on a braking operation performed by an operating person is operated to a predetermined position;
- reducing the liquid pressure supplied to a braking system with a first gradient of reduction by controlling a liquid pressure actuator which has a liquid pressure source that raises the liquid pressure of the operating liquid, and which causes a predetermined liquid pressure to act on the braking system when it is detected that the braking operation member is operated to the predetermined position;
- detecting whether a state of the braking operation of the operating person is at least equal to a predetermined threshold; and
- reducing the liquid pressure supplied to the braking system with a second gradient of reduction that is different from the first gradient of reduction when it is detected that the state of the braking operation is at least equal the predetermined threshold, with no relation to whether or not the braking operation member is operated to the position of the predetermined position.

16. A control method according to claim 15, wherein the second gradient of reduction is greater than the first gradient of reduction.

17. A control method according to claim 16, wherein the liquid pressure supplied to the braking system is reduced by increasing a degree of opening of a linear valve that controls the liquid pressure linearly with respect to the signal.

18. A control method according to claim 17, wherein operation of the liquid pressure source of the liquid pressure actuator is stopped when the degree of opening of the linear valve reaches a maximum.

19. A control method according to claim 15, wherein the liquid pressure supplied to the braking system is reduced by increasing a degree of opening of a linear valve that controls the liquid pressure linearly with respect to the signal.

* * * * *